3,317,549
PICOLINIC ACID COMPOUNDS
Howard Johnston, Walnut Creek, Calif., assignor to The Dow Chemical Company, Midland, Mich., a corporation of Delaware
No Drawing. Filed Sept. 28, 1964, Ser. No. 399,875
11 Claims. (Cl. 260—294.9)

This application is a continuation-in-part of my prior application Ser. No. 267,803 filed Mar. 25, 1963, now abandoned which in turn is a continuation-in-part of application Ser. No. 166,384 filed Jan. 15, 1962, now abandoned.

The present invention is concerned with picolinic acid compounds and more particularly with 3,6-dichloropicolinic acid compounds having the formula

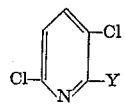

In this and succeeding formulas, Y is a carboxylic acid derived group. By "carboxylic acid derived group" is meant a group inclusive of carboxylic acid, carboxylic acid salt, cyano (nitrile), carboxylic acid amide, carboxylic acid hydrazide and carboxylic acid ester. These groups may be represented by the radicals —COOH, —COOM, —CN, —CONH$_2$, —CONHR$^1$,

—CONHR$^1$R$^2$

In the above radicals, M represents a salt group inclusive of alkali and alkaline earth salts such as sodium, potassium, lithium, magnesium, calcium, salts of other metals such as copper, iron, zinc, cobalt, nickel, ammonium and substituted ammonium salts such as methylammonium, trimethylammonium, dimethylammonium, ethylammonium, diethylammonium, triethylammonium, n-propylammonium, isopropylammonium, di-n-propylammonium, diisopropylammonium, bis(3 - hydroxypropyl)ammonium, 3 - hydroxypropylammonium, 2-hydroxypropylammonium, bis(2-hydroxypropyl)ammonium, etc. Preferred salts include inorganic salts as above enumerated, ammonium and substituted ammonium salts, which substituted ammonium salts are derived from alkylamines and alkanolamines in which one or more alkyl groups may each contain 1, 2, 3 or 4, or from 1 to 24 carbon atoms or more, and in which one or more alkanol groups may each contain 2, 3 or 4, or from 2 to about 6 carbon atoms. The substituted ammonium groups are preferably those which are derived from amines having a basic dissociation constant greater than about 10$^{-9}$. Other suitable substituted ammonium salts include salts in which the ammonium nitrogen has substituents such as cycloalkyl, alkenyl, aminoalkyl, ether-alkyl, aryl, a heterocyclic ring or forms a heterocyclic ring with the ammonium nitrogen and include salts of polybasic amines such as piperazine, hexamethylenediamine, tetraethylenepentamine, and ether amines, such as isobutyl 2-aminobutyl ether, etc. Mono and polybasic amines and ether amine salts are preferably derived from amines having from about 2 to 10 carbon atoms. R$^1$ and R$^2$ in the amides are lower aliphatic radicals such as methyl, ethyl, n-propyl, isopropyl, 2-hydroxyethyl, allyl, crotyl, n-butyl, sec.-butyl, tert.-butyl, methallyl, 3-hydroxypropyl, 2-hydroxypropyl, etc. and containing up to about 4 carbon atoms. When the amides are disubstituted amides, the sum of R$^1$ and R$^2$ preferably contains from 2 to 8 carbon atoms, inclusive. R$^3$ may be methyl, ethyl, phenyl or allyl. R$^4$ of the ester group is a residue of a hydroxy compound obtained by the removal of the OH group. Suitable hydroxy compounds include methanol, isopropyl alcohol, sec.-butyl alcohol, amyl alcohol, hexanol, octyl alcohol, heptyl alcohol, lauryl alcohol, tetradecyl alcohol, allyl alcohol, oleyl alcohol, methallyl alcohol, crotyl alcohol, cetyl alcohol, stearyl alcohol, capryl alcohol, polyhydroxy alcohols such as ethylene glycol, polyethylene glycol, trimethylene glycol, ether alcohols of ethylene glycol marketed under trade names such as Dowanols and Cellosolves, aralkyl alcohols such as benzyl and β-phenylethyl alcohol, nitroalcohols such as 2-nitropropanol, 2-nitroethanol, acetylenic alcohols such as propargyl alcohol, 2-methyl-3-butynol-2, 3-methyl-1-pentynol-3, 3 - butyne-1-ol, 2 - butyne-1,4-diol, 2,4-hexadiyne-1,6-diol, 3,6-dimethyl - 4 - octyne-3,6-diol, and other hydroxy compounds such as 2,4-dichlorophenoxyethanol, 2,4,5 - trichlorophenoxyethanol, 2 - (2,4-dichlorophenoxy)propanol, 2 - (2,4,5 - trichlorophenoxy)-propanol, phenol, pentachlorophenol, 4,6-dinitro-o-sec.-amylphenol, 4,6-dinitro-o-sec.-butylphenol, 4,6-dinitro-o-cresol, mono- and polyhalophenols, etc. Preferred esters include alkyl esters wherein the alkyl radical contains from 1 to 18 carbon atoms, inclusive, alkenyl esters wherein the alkenyl radical contains 3 to 18 carbon atoms, inclusive, glycol esters derived from mono, di- and polyglycols where the glycol contains from 2 to 3 carbon atoms in each glycol unit, such as propylene glycol, diethylene glycol, dipropylene glycol, polypropylene glycol, etc., mono- and diglycol lower alkyl, phenyl and chlorophenyl ether esters where the glycol is of the ethylene and propylene series and lower alkyl contains from 1 to 4 carbon atoms, inclusive, and chlorophenyl contains from 1 to 3 chlorine atoms, inclusive, aralkyl esters wherein the aralkyl radical contains from 7 to 10 carbon atoms, mononitroalkyl esters wherein the alkyl radical contains from 2 to 3 carbon atoms, inclusive, alkynyl esters wherein the alkynyl radical contains from 3 to 10 carbon atoms, inclusive, dialkylaminoalkyl esters wherein the dialkylaminoalkyl radical contains from 4 to 10 carbon atoms, inclusive, phenyl ester, and halophenyl esters containing from 1 to 5 chlorine atoms, inclusive, and nitroaryl esters containing on the phenyl ring from 1 to 2 nitro groups and from 0 to 1 alkyl group containing from 1 to 5 carbon atoms, inclusive. Other esters include pyridyl and chloropyridyl esters containing from 1 to 3 chlorine atoms. Preferred esters from ether alcohols of ethylene and alkylene glycols marketed under trade names such as Dowanols and Cellosolves are those in which R$^4$ in —COOR$^4$ may be represented by the formula —(C$_z$H$_{2z}$O)$_v$R$^5$ wherein R$^5$ is lower alkyl containing from 1 to 4 carbon atoms, inclusive, phenyl, or chlorophenyl containing from 1 to 3 chlorine atoms, inclusive, wherein z is an integer of from 2 to 3, inclusive, and v may be 1 or 2. Preferred esters from glycols are those in which R$^4$ may be represented by —(C$_z$H$_{2z}$O)$_v$H with z and v having the preceding values.

Representative materials falling within the scope of this invention include 3,6-dichloropicolinic acid, methyl 3,6-dichloropicolinate, 6-nitro-o-cresyl 3,6-dichloropicolinate, isobutyl 3,6-dichloropicolinate, isoamyl 3,6-dichloropicolinate, isooctyl 3,6-dichloropicolinate, lauryl 3,6-dichloropicolinate, stearyl 3,6-dichloropicolinate, allyl 3,6-dichloropicolinate, crotyl 3,6-dichloropicolinate, oleyl 3,6-dichloropicolinate, 2,4,6-trichlorophenyl 3,6-dichloropicolinate, 2,4,5-trichlorophenyl 3,6-dichloropicolinate, 2-nitro-ethyl 3,6-dichloropicolinate, benzyl 3,6-dichloropicolinate, 2-hydroxyethyl 3,6-dichloropicolinate, propargyl 3,6-dichloropicolinate, 2-(2-ethoxy-ethoxy)ethyl 3,6-dichloropicolinate, p-nitrophenyl 3,6-dichloropicolinate, p-chlorophenyl 3,6-dichloropicolinate, 4-nitro-o-cresyl 3,6 - dichloropicolinate, 2 - [1-methyl-2-(p-chlorophenyl)] ethyl 3,6-dichloropicolinate, di-(n-propyl)aminoethyl 3,6 - dichloropicolinate, 2-(2-hydroxyethoxy)ethyl 3,6-dichloropicolinate, 3,6-dichloropicolinamide, N-(n-butyl)-3,6 - dichloropicolinamide, N-allyl-3,6-dichloropicolinamide, N-(2-hydroxyethyl)-3,6-dichloropicolinamide, N,N-diethyl-3,6-dichloropicolinamide, N-(2-hydroxypropyl)-3,6-dichloropicolinamide, calcium 3,6-dichloropicolinate, 2-hydroxyethylammonium 3,6-dichloropicolinate, tris(2-hydroxyethyl)ammonium 3,6-dichloropicolinate, barium 3,6-dichloropicolinate, n-octadecylammonium 3,6-dichloropicolinate, n-dodecylammonium 3,6-dichloropicolinate, n-decylammonium 3,6-dichloropicolinate, tris(2-hydroxypropyl)ammonium 3,6-dichloropicolinate, n-hexadecylammonium 3,6-dichloropicolinate, n-hexyl-ammonium 3,6-dichloropicolinate, bis(2-hydroxypropyl)ammonium 3,6-dichloropicolinate, 2-hydroxypropylammonium, 2-hydroxy-1,1-dimethylethylammonium 3,6-dichloropicolinate, n-octylammonium 3,6-dichloropicolinate, 3,6-dichloropicolinonitrile, 3,6-dichloropicolinic acid allylhydrazide, sec.-butyl 3,6-dichloropicolinate, n-heptyl 3,6-dichloropicolinate, 2-(diethylamino)-ethyl 3,6-dichloropicolinate, 2-(dimethylamino)ethyl 3,6-dichloropicolinate, 2-(di-n-butylamino)ethyl 3,6-dichloropicolinate, etc.

The products of the present invention are white or light colored solids or liquids. These products vary in solubility depending on the particular derivative from low to moderate solubility in water and from low to high solubility in many organic solvents such as acetone, ethanol, isopropyl alcohol, toluene, xylene, dimethylformamide, etc. The compounds of the present invention are useful as pesticides and are adapted to be employed for the control of insects, mites, trash fish and microbes. The products are also useful as plant growth control agents.

3,6-dichloropicolinic acid, i.e., the compound wherein Y is —COOH in the above formula, may be prepared by the acid hydrolysis of 3,6-dichloro-2-(trichloromethyl)pyridine. Suitable acids for carrying out the reaction include nitric, phosphoric and sulfuric acids. The reaction may be carried out at a temperature in the range of from about 20° C. to about 100° C.; heating the mixture at reflux temperature is both suitable and convenient when nitric acid is used. The reaction is conveniently carried out by mixing together 3,6-dichloro-2(trichloromethyl)pyridine and aqueous acid and maintaining the resulting mixture from about 20° C. to 140° C. for from about ½ to 2 hours to obtain the desired 3,6-dichloropicolinic acid product. After completion of the heating, the reaction mixture is poured onto ice or ice-water whereupon the 3,6-dichloropicolinic acid precipitates as a white crystalline solid. The latter is recovered by filtration and purified, if desired, by conventional procedures.

The products of the present invention which are salts, i.e., Y in above formula is —COOM may be prepared by reacting 3,6-dichloropicolinic acid prepared as above described with the appropriate hydroxide, carbonate or amine base. In carrying out the reaction, substantially equivalent proportions of the acid and the appropriate base are mixed together in a suitable solvent such as alcohol-water whereupon a reaction takes place with the formation of the desired salt. The salt is recovered as residue by vaporizing off the solvent and water by-product formed when the base is hydroxide. The alkaline earth and heavy metal salts are preferably prepared by the reaction of alkali metal prepared as just described with an inorganic or acetate salt of the appropriate metal. The desired heavy metal salt precipitates in the reaction mixture and may be recovered by conventional procedures.

The 3,6-dichloropicolinic acid compounds which are esters, i.e., compounds wherein Y is —COOR$^4$ in above formula, may be prepared by reacting 3,6-dichloropicolinic acid or a derivative thereof with an appropriate hydroxy compound having the Formula, R$^4$OH. When R$^4$OH is an alcohol, the ester may be prepared by mixing the acid and alcohol reactants together in the presence of an acid catalyst whereupon a reaction takes place with the formation of the desired 3,6-dichloropicolinate ester product. Gaseous hydrogen chloride is conveniently employed as a catalyst, although other acids such as sulfuric acid, nitric acid, phosphoric acid and oxalic acid may be added in catalytic amounts to the reaction mixture. With lower boiling alcohols, excess alcohol may be employed to serve as reaction medium. With higher boiling alcohols, an inert solvent such as benzene or xylene may be employed. The reaction takes place over a temperature in the range of from about 10° C. to about 150° C. or the boiling point of alcohol reactant or solvent. The amounts of the reactants are not critical but the reaction is facilitated by employing an excess of alcohol. The time is not critical and depends to some extent on the reaction temperature.

In a preferred method for carrying out the reaction, 3,6-dichloropicolinic acid and the appropriate hydroxy compound are mixed together and gaseous hydrogen chloride added thereto while maintaining the temperature below about 20° C. until the reaction mixture is saturated with hydrogen chloride. The mixture is then allowed to warm to room temperature and kept at room temperature for several hours, conveniently overnight. Thereafter, the unreacted alcohol and hydrogen chloride are removed by vaporization and the desired 3,6-dichloropicolinate ester product recovered by conventional procedures.

The ester compounds of the present invention derived from lower alkanols may be prepared by an alternative method wherein 3,6-dichloro-2-(trichloromethyl)pyridine, an appropriate alkanol and water are reacted in the presence of silver nitrate to produce the desired ester product and silver chloride and nitric acid by-products. The exact amounts of the reactants are not critical; however, it is desirable that the alcohol, water and silver nitrate be employed in molar excess. The reaction is conveniently carried out at the reflux temperature of the reaction mixture for a time sufficient to complete the reaction as can be determined by the cessation in the formation of silver chloride precipitate.

In carrying out the reaction according to the method, 3,6-dichloro-2-(trichloromethyl)pyridine and molar excess of silver nitrate, lower alkanol and water are heated together until no further reaction appears to be taking place as determined by the silver chloride formation. Thereafter, hydrogen chloride is added to the reaction mixture to precipitate the unreacted silver nitrate as silver chloride. The precipitate is removed by filtration, the filtrate adjusted to about pH 3 with sodium bicarbonate to form the neutral ester free of the hydrochloride and the neutral ester extracted with a suitable water-immiscible solvent. The ester product is then recovered by conventional procedures.

The ester compounds of the present invention derived from phenols are preferably prepared from the corresponding acid chloride and appropriate phenol in the presence of tertiary amine to produce the desired phenyl ester product and hydrogen chloride by-product. The exact amount of the reactants is not critical, some product being obtained in any case; usually substantially equimolar proportions of the reactants are employed. A large excess of water-miscible tertiary amine is used, the tertiary amine functioning not only to promote the reaction but also to act as a solvent reaction medium. Suitable tertiary amines include pyridine, picoline, trimethylamine and triethylamine. The reaction is carried out over a period of from about 1 hour to about 10 hours at temperatures ranging from room temperature to the boiling point of the solvent. The product may be isolated from the reaction mixture by pouring the mixture into cold, dilute aqueous alkali metal bicarbonate solution whereupon the desired phenyl ester compound of 3,6-dichloropicolinic acid precipitates.

In carrying out the preparation of phenyl esters according to this method, the acid chloride is prepared as the first step of the reaction by warming together on the steam bath 3,6-dichloropicolinic acid with a molar excess of thionyl chloride. The heating process is continued until the reaction is complete as evidenced by the cessation in the evolution of by-product gases, hydrogen chloride and sulfur dioxide. The mixture is then subjected to reduced pressure to recover a 3,6-dichloropicolynyl chloride intermediate compound (as hydrochloride) which is then used in the second step of the reaction.

The appropriate phenol for the desired phenyl ester is dissolved in excess tertiary amine base and thereafter, the 3,6-dichloropicolinyl chloride intermediate compound is added portionwise thereto. The mixture is allowed to react at a temperature in the range of from room temperature to the boiling point of the solvent for from about 1 hour to 10 hours and thereafter added slowly to cold, dilute alkali bicarbonate to precipitate the desired phenyl ester compound of 3,6-dichloropicolinic acid. The latter may then be recovered by conventional procedures.

The foregoing process is also adaptable for the preparation of dialkylaminoalkyl esters wherein the acid chloride and dialkylaminoalkanol are mixed together in an inert solvent such as benzene or toluene and reacted as above described. The process is also adaptable for the preparation of esters from pyridinols, chloropyridinols, glycols and ether alcohols.

The 3,6-dichloropicolinic acid compounds which are amides, i.e., compounds wherein Y is $-CONH_2$, $-CONHR^1$ or $-CONR^1R^2$ or which are hydrazides, i.e., compounds wherein Y is $-CONHNH_2$, or $-CONHNHR^3$ may be prepared by reacting a lower alkyl ester of 3,6-dichloropicolinic acid with the appropriate nitrogen base. Thus, the amides are prepared by reacting the ester with ammonia, or appropriate amine $R^1NH_2$ or $R^1R^2NH$; the hydrazides are prepared by reacting the ester with hydrazine or substituted hydrazine, $R^3NHNH_2$. The reaction may be carried out at a temperature of from about 15° C. to about 100° C. at pressures ranging from atmospheric pressure to the autogeneous pressure of a closed system. The amounts of the reactants are not critical, however, an excess of the nitrogen base reactant is generally desirable. The reaction may be carried out in the presence of an inert solvent. Lower alcohols and mixtures thereof with water are suitable as solvents. As a result of these steps the amide or hydrazide is obtained and may be recovered as residue by vaporizing off the solvent and/or unreacted nitrogen base. The product may then be purified by conventional procedures.

In carrying out the reaction, alkyl 3,6-dichloropicolinate, preferably, methyl 3,6-dichloropicolinate and an appropriate nitrogen base are mixed together in an alcoholic solvent and the resulting mixture heated at reflux temperature for several hours whereupon a reaction takes place with the formation of an amide of 3,6-dichloropicolinic acid. The mixture is then poured into water to precipitate the amide as a solid or liquid and the latter is thereafter recovered by conventional procedures.

When the 3,6-dichloropicolinic acid compound is a nitrile, i.e., it is 3,6-dichloropicolinonitrile, it may be prepared by heating 3,6-dichloropicolinamide with phosphorous pentoxide. Excess phosphorous pentoxide is preferably employed. The reaction is carried out in the temperature range of from 170° to 250° C. The reaction time is dependent on the reaction temperature and varies from a few minutes to several hours.

In carrying out the reaction, 3,6-dichloropicolinamide is heated with a molar excess of phosphorus pentoxide to obtain the desired 3,6-dicholoropicolinonitrile. The latter is recovered from the reaction mixture by fractional distillation.

The following examples illustrate the invention but are not to be construed as limiting:

EXAMPLE 1.—3,6-DICHLOROPICOLINIC ACID 3.0 grams (0.011 mole) of 3,6-dichloro-2-(trichloromethyl)-pyridine and 10 milliliters of concentrated nitric acid were mixed together and the resulting mixture heated at reflux temperature for 70 minutes. During the heating, a reaction took place with the formation of the desired 3,6-dichloropicolinic acid product. After completion of the heating, the reaction mixture was cooled and thereafter poured over ice to obtain 3,6-dichloropicolinic acid product as a precipitate. The latter was recovered by filtration and recrystallized from benzene to obtain a purified product melting at 152°–153° C.

EXAMPLE 2.—3,6-DICHLOROPICOLINIC ACID

In an operation carried out in a similar manner, 200 grams (0.76 mole) of 3,6-dichloro-2-(trichloromethyl) pyridine and 750 milliliters of concentrated nitric acid were mixed together and heated at reflux temperature for 30 minutes to obtain 137.5 grams (or 94.5% of theoretical) or the desired 3,6-dichloropicolinic acid product. The latter on recrystallization from benzene melted from 150° to 152° C.

EXAMPLE 3.—METHYL 3,6-DICHLOROPICOLINATE 10 grams (0.052 mole) of 3,6-dichloropicolinic acid was dissolved in 100 milliliters of methanol and gaseous hydrogen chloride passed into the resulting solution until the latter was saturated with the hydrogen chloride. The mixture was kept below 20° C. during the operation; thereafter, the mixture was allowed to warm to room temperature and allowed to stand at this temperature overnight. At the end of this period, the mixture was concentrated by vaporizing off most of the unreacted methanol. The residue was then added to water to precipitate the desired methyl 3,6-dichloropicolinate product as a white solid in a yield of 9.15 grams or 85.7 percent of theoretical. Methyl 3,6-dichloropicolinate melted at 53°–54° C.

EXAMPLE 4

In operations carried out in a manner similar to that described in Example 3, the following esters are prepared:

Ethyl, 3,6-dichloropicolinate having a molecular weight of 220 by the reaction of ethanol and 3,6-dichloropicolinic acid.

Isopropyl 3,6-dichloropicolinate having a molecular weight of 234 by the reaction of isopropyl alcohol and 3,6-dichloropicolinic acid.

Normal-butyl 3,6-dichloropicolinate having a molecular weight of 248 by the reaction of normal-butyl alcohol and 3,6-dichloropicolinic acid.

Tertiary-butyl 3,6-dichloropicolinate having a molecular weight of 248 by the reaction of tertiary-butyl alcohol and 3,6-dichloropicolinic acid.

Normal-decyl 3,6-dichloropicolinate having a molecular weight of 332 by the reaction of n-decyl alcohol and 3,6-dichloropicolinic acid.

2,4-dichlorophenoxyethyl 3,6-dichloropicolinate having a molecular weight of 391 by the reaction of 2,4-dichlorophenoxyethanol and 3,6-dichloropicolinic acid.

α-Propylbenzyl 3,6-dichloropicolinate by the reaction of α-propylbenzyl alcohol and 3,6-dichloropicolinic acid.

2-nitro-1-butyl 3,6-dichloropicolinate by the reaction of 2-nitro-1-butanol and 3,6-dichloropicolinic acid.

2-ethoxyethyl 3,6-dichloropicolinate by the reaction of 2-ethoxyethanol and 3,6-dichloropicolinic acid.

EXAMPLE 5.—METHYL 3,6-DICHLOROPICOLINATE 25.7 grams (0.15 mole) of silver nitrate was added to a solution of 10.0 grams (0.0376 mole) of 3,6-dichloro-2-(trichloromethyl)-pyridine in 165 milliliters of approximately 85% aqueous methanol and the resulting mixture heated at reflux temperature for 3 hours. During the heating a reaction took place with the formation of methyl 3,6-dichloropicolinate and silver chloride and nitric acid by-products. Hydrochloric acid was then added to the reaction mixture to precipitate the unreacted silver nitrate as silver chloride. The solids were then removed by filtration and the filtrate concentrated vaporizing off methanol and water. The residue was added to water and sodium bicarbonate added to the resulting mixture in amount sufficient to adjust the pH to about 3. The ester product present in the aqueous mixture was removed therefrom by extraction with benzene and thereafter, recovered from the benzene solution as residue by vaporizing off the benzene. The product shows no melting point depression with the product prepared according to Example 3.

EXAMPLE 6.—3,6-DICHLOROPICOLINAMIDE 5 milliliters of concentrated ammonium hydroxide was added to a solution of 3.5 grams (0.017 mole) of methyl 3,6-dichloropicolinate in 15 milliliters of methanol. The resulting mixture was stirred and heated to reflux temperature for a few minutes and thereafter cooled and added to water to precipitate the desired 3,6-dichloropicolinamide product. The latter was then recovered by filtration. The product was a white crystalline solid melting at 188°–189° C.

EXAMPLE 7.—N-ETHYL 3,6-DICHLOROPICOLINAMIDE 4.5 grams (0.10 mole) of ethylamine is added to a solution of 3.5 grams (0.017 mole) of methyl 3,6-dichloropicolinate in 15 milliliters of ethanol. The resulting mixture is heated at reflux temperature for a few minutes, then cooled and added to water to precipitate an N-ethyl 3,6-dichloropicolinamide product. The latter is recovered by extraction with benzene followed by vaporizing off the benzene solvent to obtain as residue an N-ethyl 3,6-dichloropicolinamide product having a molecular weight of 219.

EXAMPLE 8

In preparations carried out in a manner similar to that described in Examples 6 and 7, the following compounds are prepared:

N-methyl 3,6-dichloropicolinamide having a molecular weight of 205 by the reaction of methyl 3,6-dichloropicolinate and aqueous methylamine in methanol solvent.

N-propyl 3,6-dichloropicolinamide having a molecular weight of 234 by the reaction of methyl 3,6-dichloropicolinate and propylamine in methanol solvent.

N-isobutyl 3,6-dichloropicolinamide having a molecular weight of 248 by the reaction of methyl 3,6-dichloropicolinate and isobutylamine in methanol solvent.

N,N-dimethyl 3,6-dichloropicolinamide having a molecular weight of 219 by the reaction of methyl 3,6-dichloropicolinate and dimethylamine in methanol solvent.

3,6-dichloropicolinic acid phenylhydrazide by the reaction of methyl 3,6-dichloropicolinate and phenylhydrazine.

3,6-dichloropicolinic acid methylhydrazide by the reaction of methyl 3,6-dichloropicolinate and methylhydrazine.

EXAMPLE 9.—SODIUM 3,6-DICHLOROPICOLINATE 2 grams (0.05 mole) of sodium hydroxide and 9.6 grams (0.05 mole) of 3,6-dichloropicolinic acid are mixed together in 50% aqueous ethanol until a substantially clear solution is obtained. Thereafter, the solvent is vaporized off to obtain as residue a sodium 3,6-dichloropicolinate product having a molecular weight of 214.

EXAMPLE 10

In a similar manner, the following compounds are prepared:

Lithium 3,6-dichloropicolinate having a molecular weight of 198 by the reaction of lithium hydroxide and 3,6-dichloropicolinic acid.

Ammonium 3,6-dichloropicolinate having a molecular weight of 207 by the reaction of ammonium hydroxide and 3,6-dichloropicolinic acid.

Potassium 3,6-dichloropicolinate having a molecular weight of 230 by the reaction of potassium hydroxide and 3,6-dichloropicolinic acid.

Trimethylammonium 3,6-dichloropicolinate by the reaction of trimethylamine and 3,6-dichloropicolinic acid.

Bis(2-hydroxyethyl)ammonium 3,6-dichloropicolinate by the reaction of bis(2-hydroxyethyl)amine and 3,6-dichloropicolinic acid.

Secondary-butylammonium 3,6-dichloropicolinate by the reaction of secondary-butylamine and 3,6-dichloropicolinic acid.

EXAMPLE 11

Copper 3,6-dichloropicolinate by the reaction of copper acetate and sodium 3,6-dichloropicolinate.

Nickel 3,6-dichloropicolinate by the reaction of nickel acetate and sodium 3,6-dichloropicolinate.

Ferric 3,6-dichloropicolinate by the reaction of ferric acetate and sodium 3,6-dichloropicolinate.

EXAMPLE 12.—3,6-DICHLOROPICOLINIC ACID HYDRAZIDE 7.5 grams (0.15 mole) of hydrazine hydrate is warmed on the steam bath and 19 grams (0.1 mole) of methyl 3,6-dichloropicolinate added portionwise thereto. After completion of the addition, the resulting mixture is heated on the steam bath for several hours and thereafter allowed to cool to room temperature whereupon the desired 3,6-dichloropicolinic acid hydrazide product precipitates as a crystalline solid. The latter is recovered and purified by washing with water and has a molecular weight of 206.

EXAMPLE 13.—4,6-DINITRO-o-CRESYL 3,6-DICHLOROPICOLINATE 17.6 grams (0.1 mole) of 3,6-dichloropicolinic acid and 3.6 milliliters (0.3 mole) of thionyl chloride are heated together at reflux temperature until reaction is complete as evidenced by cessation in evolution of hydrogen chloride and sulfur dioxide by-product gases. The mixture is then subjected to reduced pressure to remove unreacted thionyl chloride and to recover the desired 3,6-dichloropicolinyl chloride compound intermediate.

19.8 grams (0.1 mole) of 4,6-dinitro-o-cresol is dissolved in 40 milliliters of pyridine and the mixture cooled in an ice bath. The 3,6-dichloropicolinyl chloride compound prepared as above described is added slowly and in portions to the mixture. The resulting mixture is allowed to stand at room temperature for about 8 hours and then added portionwise to cold, dilute aqueous sodium bicarbonate solution to obtain 4,6-dinitro-o-cresyl 3,6-dichloropicolinate product as a crystalline solid having a molecular weight of 372.

EXAMPLE 14

In a manner similar to that described in Example 13, the following compounds are prepared:

2,4-dichlorophenyl 3,6-dichloropicolinate by the reaction of 2,4-dichlorophenol and 3,6-dichloropicolinyl chloride.

3,4,5-trichlorophenyl 3,6-dichloropicolinate by the reaction of 3,4,5-trichlorophenol and 3,6-dichloropicolinyl chloride.

2,4-dinitrophenyl 3,6-dichloropicolinate by the reaction of 2,4-dinitrophenol and 3,6-dichloropicolinyl chloride.

EXAMPLE 15.—3,6-DICHLOROPICOLINONITRILE 7.8 grams (0.41 mole) of 3,6-dichloropicolinamide and 8.1 grams (0.57 mole) of phosphorus pentoxide were mixed together and heated at 170°–180° C. for forty-five minutes. The mixture was then distilled at reduced pressure to obtain the desired 3,6-dichloropicolinonitrile melting at 96°–98° C. The yield of the product was 5.5 grams or 78 percent of theoretical.

EXAMPLE 16

In a manner similar to that described in Example 3, the following esters are prepared:

Normal-hexyl 3,6-dichloropicolinate by the reaction of n-hexyl alcohol and 3,6-dichloropicolinic acid.

Normal-octadecyl 3,6-dichloropicolinate by the reaction of n-octadecyl alcohol and 3,6-dichloropicolinic acid.

Benzyl 3,6-dichloropicolinate by the reaction of benzyl alcohol and 3,6-dichloropicolinic acid.

Normal-decyl 3,6-dichloropicolinate by the reaction of n-decyl alcohol and 3,6-dichloropicolinic acid.

2-hydroxyethyl 3,6-dichloropicolinate by the reaction of ethylene glycol and 3,6-dichloropicolinic acid.

2-hydroxypropyl 3,6-dichloropicolinate by the reaction of propylene glycol and 3,6-dichloropicolinic acid.

EXAMPLE 17

In a manner similar to that described in Example 13, the 3,6-dichloropicolinyl chloride intermediate is prepared from 3,6-dichloropicolinic acid and thionyl chloride. Thereafter, employing the intermediate 3,6-dichloropicolonyl chloride and pyridine solvent, the following compounds are prepared:

2-methoxyethyl 3,6-dichloropicolinate by the reaction of ethylene glycol monomethyl ether and 3,6-dichloropicolinyl chloride.

2-(2-ethoxyethoxy)ethyl 3,6-dichloropicolinate by the reaction of diethylene glycol monoethyl ether and 3,6-dichloropicolinyl chloride.

2-(normal-butoxy)ethyl 3,6-dichloropicolinate by the reaction of ethylene glycol mono-n-butyl ether and 3,6-dichloropicolinyl chloride.

1 - methyl - 2 - (2,4 - dichlorophenoxy)ethyl 3,6 - dichloropicolinate by the reaction of 1-(2,4-dichlorophenoxy)-2-propanol and 3,6-dichloropicolinyl chloride.

1 - methyl - 2 - (p - chlorophenoxy)ethyl 3,6 - dichloropicolinate by the reaction of 1-(p-chlorophenoxy)-2-propanol and 3,6-dichloropicolinyl chloride.

2-(2-hydroxyethoxy)ethyl 3,6-dichloropicolinate by the reaction of diethylene glycol and 3,6-dichloropicolinyl chloride.

EXAMPLE 18

In a manner similar to that described in Example 13 and in the foregoing examples, 3,6-dichloropicolinyl chloride (0.1 mole), prepared as described in Example 13, and 2-(dimethylamino)ethanol (0.1 mole) are mixed together in about 50 milliliters of benzene and heated at reflux temperature for about one hour to obtain the desired 2-(dimethylamino)ethyl 3,6-dichloropicolinate product.

EXAMPLE 19

In a manner similar to that described in Examples 13 and 19, the following compounds are prepared:

2-(diethylamino)ethyl 3,6-dichloropicolinate by the reaction of 3,6-dichloropicolinyl chloride and 2-(diethylamino)ethanol.

2-(di-n-butylamino)ethyl 3,6-dichloropicolinate by the reaction of 3,6-dichloropicolinyl chloride and 2-(di-n-butylamino)ethanol.

1 - methyl - 2 - (dimethylamino)ethyl 3,6-dichloropicolinate by the reaction of 3,6-dichloropicolinyl chloride and 1-dimethylamino-2-propanol.

3-(dimethylamino)propyl 3,6-dichloropicolinate by the reaction of 3,6-dichloropicolinyl chloride and 3-(dimethylamino)-1-propanol.

EXAMPLE 20

In a similar manner, 3,6-dichloropicolinyl chloride (0.1 mole) and 2,3,5-trichloro-4-pyridinol (0.1 mole) are mixed together in about 50 milliliters of benzene and 5 milliliters of pyridine added thereto, and the resulting mixture heated together at reflux temperature for about one hour to obtain the desired 2,3,5-trichloro-4-pyridyl 3,6-dichloropicolinate product.

EXAMPLE 21

In a similar manner, the following compounds are prepared:

2-pyridyl 3,6-dichloropicolinate by the reaction of 3,6-dichloropicolinyl chloride and 4-pyridinol.

2,3,6-trichloro-4-pyridyl 3,6-dichloropicolinate by the reaction of 2,3,6-trichloro-4-pyridinol and 3,6-dichloropicolinyl chloride.

EXAMPLE 22

In a manner similar to that described in Example 9, the following salts are prepared:

Normal-octylammonium 3,6-dichloropicolinate by the reaction of n-octylamine and 3,6-dichloropicolinic acid.

Triethylammonium 3,6-dichloropicolinate by the reaction of triethylamine and 3,6-dichloropicolinic acid.

Normal-octadecylammonium 3,6-dichloropicolinate by the reaction of n-octadecylamine and 3,6-dichloropicolinic acid.

2 - hydroxyethylammonium 3,6 - dichloropicolinate by the reaction of ethanolamine and 3,6-dichloropicolinic acid.

Tris(2 - hydroxypropyl)ammonium 3,6 - dichloropicolinate by the reaction of tris(isopropanol)amine and 3,6-dichloropicolinic acid.

2 - hydroxy - 1,1 - dimethylethylammonium 3,6 - dichloropicolinate by the reaction of 2-amino-2-methyl-1-propanol and 3,6-dichloropicolinic acid.

Tri(n-butyl)ammonium 3,6-dichloropicolinate by the reaction of tri(n-butyl)amine and 3,6-dichloropicolinic acid.

Dicyclohexylammonium 3,6-dichloropicolinate by the reaction of dicyclohexylamine and 3,6-dichloropicolinic acid.

2-aminoethylammonium 3,6-dichloropicolinate by the reaction of ethylenediamine and 3,6-dichloropicolinic acid.

2-(2-aminoethyl)aminoethyl 3,6-dichloropicolinate by the reaction of diethylenetriamine and 3,6-dichloropicolinic acid.

Piperidino 3,6-dichloropicolinate by the reaction of piperidine and 3,6-dichloropicolinic acid.

1-isobutoxy, 2-butylammonium 3,6-dichloropicolinate by the reaction of 1-isobutoxy, 2-amino butane with 3,6-dichloropicolinic acid.

EXAMPLE 23

Sodium 3,6-dichloropicolinate (0.1 mole), prepared in the manner described in Example 9, and barium chloride (0.05 mole) are mixed together in aqueous solution whereupon a reaction takes place with the formation of a precipitate. The latter is recovered by filtration to obtain the desired barium 3,6-dichloropicolinate product as a hydrate.

EXAMPLE 24

In a similar manner, calcium 3,6-dichloropicolinate is prepared from sodium 3,6-dichloropicolinate and calcium chloride.

The 3,6-dichloropicolinic acid compounds of the present invention are useful as pesticides and are adapted to be employed for the control of plant and water infesting pests such as plum curculio, southern army worm, two spotted spider mite, lake emerald shiner, etc.

In a representative operation as an insecticide, aqueous compositions containing 500 parts by weight of 3,6-dichloropicolinic acid per million parts of ultimate dispersion were applied to plants surfaces to obtain good controls of southern army worm. In representative operations as herbicide, good controls were obtained when separate plots treated with 3,6-dichloropicolinic acid, methyl 3,6-dichloropicolinate or 3,6-dichloropicolinamide at dosage rates of 50 pounds per acre were thereafter seeded with pea, German millet, sorghum/milo and Japanese millet.

The products of the present invention are also useful as plant growth control agents. In such use, they are advantageously employed in controlling, inhibiting or arresting the growth of undesirable plants and weed seeds, both aquatic and terrestrial. The compounds of the present invention are also useful in general to the various purposes in the art of growth control or regulation for which plant hormones are suitable. For example, the compounds of the present invention and compositions containing compounds of the present invention may be employed to speed up the germination of seeds, and to stimulate the formation of roots, buds and flowers. They may also be used to produce seedless fruits without the use of pollen (parthenocarpy), and to prevent or retard the formation of the abscission layer on fruit trees, thereby preventing premature fruit drop. In other applications, such compositions may be used to cause fruit drop, set flowers or defoliate plants. In addition, the compounds and compositions thereof may be used to eradicate the lower or parasitic plants such as fungi. In such applications, the compounds may be employed either as the sole active ingredient in such compositions, as mixtures or in admixture with other plant growth control agents, hormones, contact herbicides, pesticides and/or modifying agents. The particular combination or composition to be employed will be guided by the particular results to be accomplished and is readily determined by the skilled in the art. Compositions may be applied to aerial portions of plants, to plant parts, to soil, to water adjacent to aquatic plants or to other natural or artificial plant growth media.

In representative operations for the control of undesirable aquatic plants, methyl 3,6-dichloropicolinate is separately applied to separate tanks in which are growing the waterplants Elodea, Moneywort, Salvinia and Coontail at a rate sufficient to provide a concentration in the tanks of 100 parts by weight per million parts by weight of medium. Check tanks, also containing the same aquatic plants are left untreated. For five weeks following the application, the plants are observed and it is found that by the end of this period good controls of the water plants are obtained.

In a further embodiment, the products of the present invention, or compositions containing the same advantageously can be employed in combination with other plant growth modifying agents either as adjuvants or supplementary materials for both terrestrial and aquatic applications. Representative agents include 2-chloro-4,6-bis(ethylamino) - s-triazine; 2-chloro-4-ethylamino-6-isopropylamino - s-triazine; 2 - methoxy - 4,6 - bis(isopropylamino) - s-triazine; 3-(p-chlorophenyl)-1,1-dimethylurea; 3 - (p - chlorophenyl)-1,1-dimethylurea acetate; 3-phenyl-1,1 - dimethylurea trichloroacetate; 2,4 - dichlorophenoxyacetic acid, its salts and esters; 2,4,5-trichlorophenoxyacetic acid, its salts and esters; 2-methyl-4-chlorophenoxyacetic acid, its salts and esters; 2-(2,4,5-trichlorophenoxy)-propionic acid, its salts and esters; propylethyl-n-butylthiol carbamate; isopropyl N-(3-chlorophenyl) carbamate; cis and trans 2,4-dichloro-allyl-diisopropyl thiocarbamate; ethyl di-n-propylthiocarbamate; 4-chloro-2-butynyl N-(3-chlorophenyl)carbamate; 2,3,6-trichlorobenzoic acid, its salts and esters; 2,3,5,6-tetrachlorobenzoic acid, its salts and esters; 2-methoxy-3,6-dichlorobenzoic acid, its salts and esters; 2,2-dichloropropionic acid, its salts and esters; trichloroacetic acid, its salts and esters; 4,6-dinitro-s-sec.-butylphenol; 3,5-dinitro-o-cresol; pentachlorophenol; 5 - bromo-3-isopropyl-6-methyluracil; sodium arsenite; dimethylarsenic acid; tricalcium arsenate; sodium chlorate; sodium borates; 3,6-endo-oxohexahydrophthalic acid; O - (2,4 - dichlorophenyl) - O-methyl isopropylphosphoramidothioate; 3,4 - dichloropropionanilide; 1,2 - dihydroxypyridazine - 3,6-dione; 3-amino-1,2,4-triazole; 2,3,6-trichlorophenylacetic acid, its salts and esters; 1,1' - ethylene - 2,2'-dipyridylium dibromide; 2,6-dinitro - N,N - di - n-propyl-2,2,2-trifluoro-p-toluidine; α-chloro-N-diallylacetamide; herbicidal oils; and other inorganic salts and aliphatic, aromatic and heterocyclic organic compounds.

In representative operations of such embodiment, good controls of several species of broad and narrow leaf terrestrial plants are obtained when a mixture of a picolinic acid compound and a plant growth modifying agent of one of the class comprising triazine compounds, substituted phenyl urea compounds, phenoxy compounds, carbamate compounds, substituted benzoic acid compounds, halogenated aliphatic acid compounds, substituted phenol compounds, substituted uracil compounds, arsenical compounds and inorganic salts as above named, are applied to plants at a rate sufficient to supply from about 0.5 to about 15 pounds per acre of the aminotrichloropicolinic acid compound and from about 0.12 pound to about 4000 pounds per acre of the second plant growth modifying agent. Good results are also obtained at normal field application concentrations.

The 3,6-dichloro-2-(trichloromethyl)pyridine starting material employed for the preparation of the compounds of the present invention may be prepared by photochlorinating 3-chloro-2-(trichloromethyl)pyridine while the temperature is maintained from about 120° to about 130° C. for about six hours, and thereafter cooling and recrystallizing from a hydrocarbon solvent such as hexane. The 3-chloro-2-(trichloromethyl)pyridine employed in such preparation may be prepared by photochlorinating picoline at temperatures of from about 50° to 150° C. in the presence of a small amount of water, followed by fractional distillation of the reaction mixture, recovering the portion boiling at about 100° to 104° C. at 2 millimeters of mercury pressure and recrystallizing the distillate from hexane.

The desirable compounds of the present invention may be represented by the formula

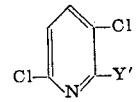

wherein Y' is a carboxylic acid derived group which may be carboxylic acid represented by the formula —COOH, cyano represented by the formula —CN, carboxylic acid salt represented by the formula —COOM', carboxylic acid hydrazide represented by the formula —CONHNH$_2$, carboxylic acid amide represented by the formulas —CONH$_2$ and —CONHR, and carboxylic acid ester represented by the formula —COOR'. In the foregoing, M' is preferably selected from the group consisting of alkali metals, alkaline earth meals, ammonium and substituted ammonium wherein said substituted ammonium contains at least one substituent selected from the group consisting of alkyl containing from 1 to 18 carbon atoms, inclusive, and hydroxyalkyl containing from 2 to 4 carbon atoms, inclusive. Other suitable substituents for M' are those derived from polybasic amines and ether amines having from about 2 to 10 carbon atoms, inclusive. R in the foregoing formula is selected from the group consisting of alkyl containing from 1 to 4 carbon atoms, inclusive. R' in the foregoing formula is a radical selected from the group consisting of alkyl containing from 1 to 18 carbon atoms, inclusive; aralkyl containing from 7 to 8 carbon atoms, inclusive; phenyl; chlorophenyl containing from 1 to 5 chlorine atoms, inclusive: —C$_n$H$_{2n}$OR" wherein R" is selected from the group consisting of hydrogen, lower alkyl containing from 1 to 4 carbon atoms, inclusive, phenyl and chlorophenyl containing from 1 to 3 chlorine atoms, inclusive, and $n$ is an integer of from 2 to 3, inclusive; and —C$_q$H$_{2q}$N(R"")$_2$ in which R"" is lower alkyl containing from 1 to 4 carbon atoms, inclusive, and $q$ is an integer of from 2 to 3, inclusive.

The preferred compounds for their especially useful properties adaptable for agronomic practices are compounds which may be represented by the formula

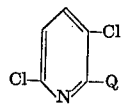

wherein Q is a carboxylic acid derived group selected from the group consisting of carboxylic acid represented by the formula —COOH; carboxylic acid salt represented by the formula —COOM'' wherein M'' is selected from the group consisting of alkali metals, alkaline earth metals, ammonium and substituted ammonium wherein said substituted ammonium contains at least one substituent selected from the group consisting of alkyl containing from 1 to 18 carbon atoms, inclusive, and hydroxyalkyl containing from 2 to 4 carbon atoms, inclusive; carboxylic acid ester represented by the formula —COOR''' wherein R''' is a radical selected from the group consisting of alkyl, —$C_nH_{2n}OR''$ and

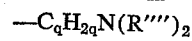

wherein in the fore-radicals, alkyl is a radical containing from 1 to 18 carbon atoms, inclusive, —$C_nH_{2n}OR''$ is a radical in which R'' is selected from the group consisting of hydrogen, lower alkyl containing from 1 to 4 carbon atoms, inclusive, phenyl and chlorophenyl containing from 1 to 3 chlorine atoms, inclusive, and $n$ is an integer of from 2 to 3, inclusive, and —$C_qH_{2q}N(R'''')_2$ is a radical in which R'''' is lower alkyl containing from 1 to 4 carbon atoms, inclusive, and $q$ is an integer of from 2 to 3, inclusive.

For some applications, the preferred 3,6-dichloropicolinic acid compounds are those in which the carboxylic acid derived group is one of the following groups: a free carboxylic acid group; a cyano group; a hydrazide group in which the hydrazide is unsubstituted; a salt group which may be alkali metal, alkaline earth metal, ammonium or substituted ammonium, the substituent is preferably alkyl or hydroxyalkyl containing as many as 18 carbon atoms and wherein the ammonium nitrogen may contain from 1 to 3 substituents; an ester group in which the radical derived from the hydroxy compound is hydrocarbon in nature, i.e., free of basic or acidic groups but which may contain unsaturation, cyclic groups, ether groups or other neutral groups; an amide group in which the amide is unsubstituted or is an N-lower alkylamide.

I claim:
1. A picolinic acid compound having the formula

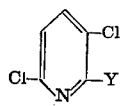

wherein Y is a caboxylic acid derived group selected from the group consisting of carboxylic acid, cyano, carboxylic acid salt, carboxylic acid hydrazide, carboxylic acid ester and carboxylic acid amide.

2. A picolinic acid compound having the formula

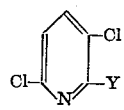

wherein Y is a carboxylic acid derived group selected from the group consisting of carboxylic acid represented by the formula —COOH; cyano represented by the formula —CN; carboxylic acid salt represented by the formula —COOM where M is selected from the group consisting of alkali metals, alkaline earth metals, copper, iron, zinc, cobalt, nickel, ammonium and substituted ammonium wherein the substituted ammonium group is derived from an amine having a basic dissociation constant greater than about $10^{-9}$, carboxylic acid amide represented by the formula selected from the group consisting of —$CONH_2$, —$CONHR^1$ and —$CONR^1R^2$ wherein $R^1$ and $R^2$ are independently selected from the group consisting of alkyl, hydroxyalkyl and alkenyl; carboxylic acid hydrazide represented by a formula selected from the group consisting of —$CONHNH_2$ and —$CONHNHR^3$ wherein $R^3$ is selected from the group consisting of methyl, ethyl, phenyl and allyl; carboxylic acid ester represented by the formula —$COOR^4$ wherein $R^4$ is a residue of a hydroxy compound selected from the group consisting of alkanols, alkenols, polyhydroxy alcohols, ether alcohols, aralkyl alcohols, nitroalcohols, alkynols, halophenoxyalkanols, phenol, halophenols, nitrophenols, dialkylaminoalkanols, pyridinols and chloropyridinols.

3. A picolonic acid compound having the formula

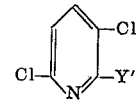

wherein Y' is a carboxylic acid derived group selected from the group consisting of carboxylic acid represented by the formula —COOH; cyano represented by the formula —CN; carboxylic acid salt represented by the formula —COOM' wherein M' is selected from the group consisting of alkali metals, alkaline earth metals, ammonium and substituted ammonium wherein said substituted ammonium contains at least one substituent selected from the group consisting of alkyl containing from 1 to 18 carbon atoms, inclusive, and hydroxyalkyl containing from 2 to 4 carbon atoms, inclusive; carboxylic acid hydrazide represented by the formula —$CONHNH_2$; carboxylic acid amide represented by a formula selected from the group consisting of —$CONH_2$ and —CONHR wherein R is an alkyl group containing from 1 to 4 carbon atoms, inclusive; and carboxylic acid ester represented by the formula —COOR' wherein R' is a radical selected from the group consisting of alkyl, aralkyl, phenyl, chlorophenyl, —$C_nH_{2n}OR''$ and —$C_qH_{2q}N(R'''')_2$; wherein in the foregoing radicals, alkyl is a radical containing from 1 to 18 carbon atoms, inclusive, aralkyl is a radical containing from 7 to 8 carbon atoms, inclusive, chlorophenyl is a radical containing from 1 to 5 chlorine atoms, inclusive, —$C_nH_{2n}OR''$ is a radical in which R'' is selected from the group consisting of hydrogen, lower alkyl containing from 1 to 4 carbon atoms, inclusive, phenyl and chlorophenyl containing from 1 to 3 chlorine atoms, inclusive, and $n$ is an integer of from 2 to 3, inclusive, and —$C_qH_{2q}N(R'''')_2$ is a radical in which R'''' is lower alkyl containing from 1 to 4 carbon atoms, inclusive and $q$ is an integer from 2 to 3, inclusive.

4. A picolonic acid compound having the formula

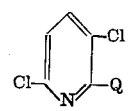

wherein Q is a carboxylic acid derived group selected from the group consisting of carboxylic acid represented by the formula —COOH; carboxylic acid salt represented by the formula —COOM'' wherein M'' is selected from the group consisting of alkali metals, alkaline earth metals, ammonium and substituted ammonium wherein said substituted ammonium contains at least one substituent selected from the group consisting of alkyl containing from 1 to 18 carbon atoms, inclusive, and hydroxyalkyl containing from 2 to 4 carbon atoms, inclusive; carboxylic acid ester represented by the formula —COOR''' is a radical selected from the group consisting of alkyl, —$C_nH_{2n}OR''$ and —$C_qH_{2q}N(R'''')_2$ wherein in the foregoing radicals, alkyl is a radical containing from 1 to 18 carbon atoms, inclusive, $-C_nH_{2n}OR''$ is a radical in which $R''$ is selected from the group consisting of hydrogen, lower alkyl containing from 1 to 4 carbon atoms, inclusive, phenyl and chlorophenyl containing from 1 to 3 chlorine atoms, inclusive, and $n$ is an integer of from 2 to 3, inclusive, and $-C_qH_{2q}N(R'''')_2$ is a radical in which $R''''$ is lower alkyl containing from 1 to 4 carbon atoms, inclusive, and $q$ is an integer of from 2 to 3, inclusive.

5. 3,6-dichloropicolinic acid.
6. Methyl 3,6-dichloropicolinate.
7. 3,6-dichloropicolinamide.
8. Sodium 3,6-dichloropicolinate.
9. Ammonium 3,6-dichloropicolinate.
10. 3,6-dichloropicolinic acid hydrazide.
11. 3,6-dichloropicolinonitrile.

References Cited by the Examiner

UNITED STATES PATENTS

2,494,204  1/1950  Robinson et al. ____ 260—294.9

FOREIGN PATENTS

630,669  11/1961  Canada.

OTHER REFERENCES

Chem. Abstracts, vol. 53, par. 20, 054a, 1959.
Graf, J. Prakt. Chem. 133, pp. 36–50 (1932), Abstracted by Chem. Abstracts, vol. 26, page 1933.
Graf, J. Prakt. Chem., 148, pp. 13–23 (1937), Abstracted by Chem. Abstracts, vol. 31, par. 2215–a.

WALTER A. MODANCE, *Primary Examiner*

ALAN L. ROTMAN, *Assistant Examiner.*